United States Patent Office 3,471,019
Patented Oct. 7, 1969

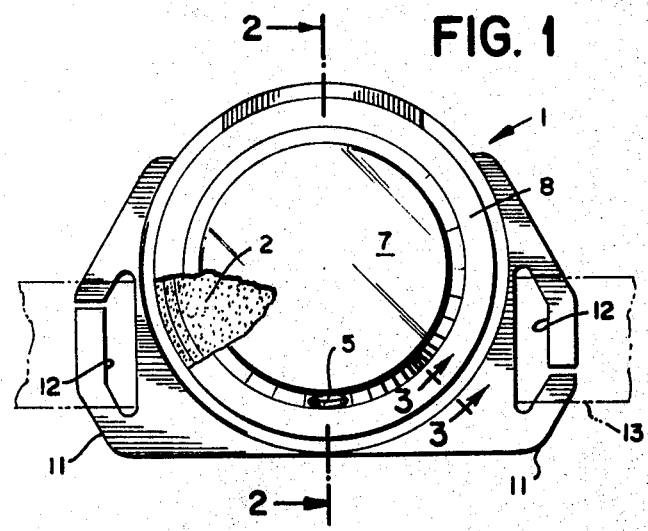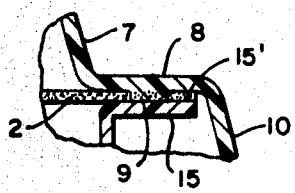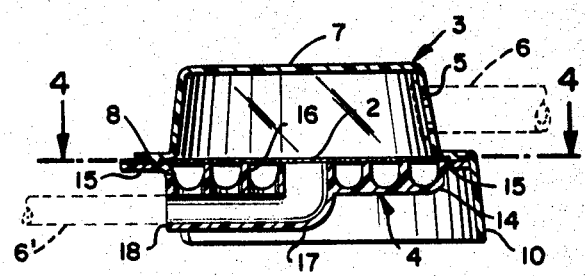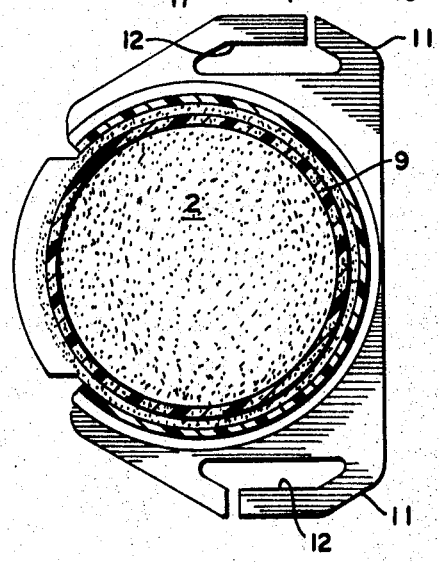
INVENTORS
BEN TRASEN
JOHN E. WEYAND
DONALD B. RISING
BY Pennie, Edmonds,
Morton, Taylor and Adams
ATTORNEYS

3,471,019
FILTER UNIT
Ben Trasen, Watertown, John E. Weyand, Needham, and Donald B. Rising, Stow, Mass., assignors to Millipore Corporation, Bedford, Mass., a corporation of Massachusetts
Filed Mar. 5, 1968, Ser. No. 710,498
Int. Cl. B01d 35/00
U.S. Cl. 210—94                                                9 Claims

ABSTRACT OF THE DISCLOSURE

A filter unit comprising a two-part housing and porous filter disposed therebetween in sealed relationship and with the central portion of the filter isolated from its periphery.

BACKGROUND OF THE INVENTION

Field of the invention

This invention relates to filter units and more particularly to a filter unit having housing parts sealed together through the pores of the filter element.

Description of the prior art

With filter units comprised of a two-part housing and an internally disposed filter sandwiched therebetween, it is necessary that the filter be completely sealed about its periphery. This is so in order to assure that the entire flow of fluid entering the housing on one side of the filter and leaving the housing on the other side is through the filter rather than around it. With presently constructed filter units of this type, this sealing of the filter is typically effected by providing the parts of the filter housing with opposed sealing members engaging against the opposite sides of the filter. In order to hold these members in sealing relationship against the filter, a sufficient pressure must be applied; and to effect this result, the two parts of the holder are conventionally assembled together with a threaded or friction connection which upon tightening produces the desired pressure against the filter. Filter units of this construction are generally adapted to be assembled by the user; and if not carefully assembled, will permit leakage of fluid around the edges of the filter. In addition, filter units of this type have the disadvantage of not providing any easily visible indication that a proper seal of the filter has in fact been accomplished.

SUMMARY OF THE INVENTION

In accordance with the teachings of the present invention, there is provided an improved filter unit in which the filter is sealed between the two parts of the housing structure by filling the pores of the filter with the material of the housing. The seal is effected in a manner visibly showing that a complete seal has been made. The filter unit of the present invention is relatively inexpensive to manufacture and is particularly suited for use in connection with filtering intravenous solutions to be injected into the bloodstream of a person.

Generally, the filter unit of the present invention includes two housing parts at least one of which is made of thermoplastic material having some degree of transparency and a porous filter sealed between the housing parts of the filter. In construction, the filter is normally opaque in appearance and its volume is predominantly pore volume. However, when the filter is flattened and/or the pores filled with transparent material, the filter itself will appear transparent. The two parts of the housing are provided with sealing portions adapted to be aligned with each other and with a peripheral portion of the filter completely surrounding the central portion of the filter. In assembly of the unit, the sealing portions of the parts of the housing are pressed against the opposite sides of the filter and the sealing portion of at least one of the parts of the housing is heated to cause the material thereof to melt and flow through the aligned pores of the peripheral portion of the filter and fuse to the sealing portion of the other part of the housing. In this way, a positive seal of the filter is produced. In addition, the filter is caused to appear transparent about its periphery at the point of seal of the two parts of the housing thus affording a visible indication that a proper seal of the filter within the housing has been made. If, on the other hand, a proper seal has not been made, there will be a break in this transparent peripheral pattern.

The filter unit of the present invention is particularly suited for filtering intravenous solutions being injected into the bloodstream of a person and is provided with means for conveniently attaching the unit to the person's body. In addition, the unit is constructed so that the connections of the tubing supplying the intravenous solution and leading to the inlet side of the filter and from its outlet side may be readily made and the unit held in proper orientation on the person's body to prevent the creation of any air lock. In this regard, the outlet side of the unit is provided with a downwardly extending skirt portion which is adapted to rest against the person's body; and the coupling for the outlet opening of the unit is positioned above the lower end of the skirt portion.

BRIEF DESCRIPTION OF THE DRAWINGS

FIG. 1 is a plan view of the filter unit of the present invention;

FIG. 2 is a cross-sectional view taken along line 2—2 of FIG. 1;

FIG. 3 is a cross-sectional view taken along line 3—3 of FIG. 1; and

FIG. 4 is a cross-sectional view taken along line 4—4 of FIG. 2.

DESCRIPTION OF THE PREFERRED EMBODIMENT

As shown in FIGS. 1 and 2, the filter unit 1 constructed in accordance with the teachings of the present invention generally includes a filter 2 disposed internally of a housing which is constructed of two parts 3 and 4 disposed on opposite sides of the filter 2.

The filter unit described below and shown in the drawings is particularly suited for use as a disposable filter unit in connection with feeding intravenous solutions to a person. Although intravenous solutions are easily sterilized, they normally contain particulate matter which if injected into the bloodstream of a person can cause very serious problems. Normally, the intravenous solutions are supplied in bottles and are administered to a person by gravity flow into the vein. The filter unit of the present invention is particularly suited for removing all particulate matter larger than 1.2 microns from the intravenous solutions just before it enters the vein. For this purpose, the filter unit may, for example, be attached to the wrist of a person immediately adjacent to the point at which the intravenous solution is to be fed into the person's vein.

The description of the preferred embodiment of the filter unit as given below is made with reference to a disposable unit for intravenous injections; however, it is to be understood that the unit itself has use in other applications where the particular features of the unit as set out below are found to be desirable.

In accordance with the teachings of the present invention, both the filter and the housing structure are so constructed and assembled in a manner providing a readily visible indication of the completeness of the seal of the filter within the housing. The filter shown in the drawings is a plastic membrane porous filter formed of continuous phase plastic base sheets such as a sheet of cellulose esters or equivalent stable sheet material. The sheet has a refractive index of about 1.5 and thus appears transparent. The filter is produced in a process which results in a multiplicity of pores in sizes ranging from 0.2 to 15 microns. The inclusion of the pores in the base sheet causes light to be diffracted and thus the filter normally appears opaque. For use in connection with filtering intravenous solutions, the pore size preferably ranges from 0.4 to 5 microns depending on the size of the particulate matter which is to be removed. Where all particulate matter having a size larger than 1.2 microns is to be removed, the pore size of the filter will be 1.2 microns. The pores of the filter advantageously consist of from about 40% to about 85% of the sheet volume.

An especially effective filter for use in the present invention is manufactured by the Millipore Corporation of Bedford, Mass., and sold under the trademark Millipore. This filter is formed of a mixture of cellulose nitrate and cellulose acetate having a thickness of about 150 microns. Although such filters have a normal opaque appearance, they appear transparent when the pores are filled with a transparent thermoplastic material. Also, when the filter is flattened by compression, it becomes transparent to some degree.

The housing used in conjunction with the filter described above is formed of two parts of thermoplastic polymeric resin with at least one of the parts having some degree of transparency. The material chosen for the housing is one that can be fused without impairing the structural integrity of the filter. As presently preferred, the parts of the housing are fabricated from impact resistance transparent polystyrene having a refractive index of about 1.50. Other thermoplastic materials such as polymethyl methacrylate can be used.

As shown in FIGS. 2 and 3, the housing part 3, which is adapted to function as the inlet side of the filter unit, is provided with an inlet opening 5 to which a suitable tubing 6 leading from the supply of intravenous solution may be connected. The housing part 3 is formed with a centrally disposed recessed portion 7 and flanged peripheral portion 8. As most clearly shown in FIG. 3, the flanged portion of the housing 3 is provided with a peripheral rib formed integrally therewith and defining a peripheral sealing portion 9. As shown in FIG. 4, this rib completely surrounds the central recessed portion 7 of the housing part 3. As also shown in FIG. 4, the housing part 3 includes a skirt portion 10 extending from the flanged portion in a direction away from the recessed portion. The skirt portion 10 includes laterally extending wings 11 which, in turn, include slots 12 through which a suitable strap, such as indicated at 13 in FIG. 1, may be threaded to attach the filter unit to the individual's wrist.

The other part 4 of the housing functions as the outlet side of the unit. As shown in FIGS. 2 and 3, this housing part also includes a recessed portion 14 and a flange 15, surrounding the recessed portion. The upper surface 15' of this flange as shown in FIG. 3 defines the sealing portion for this part of the housing and is adapted to be aligned with the sealing portion 9 of the housing part 3. Although the filter 2 is made strong and tough, it must be supported in order to withstand the pressure of the fluid flowing therethrough without tearing. For this purpose, the recessed portion of the housing part 4 is provided with a plurality of upstanding rib means 16. These rib means are preferably concentrically disposed and terminate in an upper filter supporting surface which is disposed in the plane of the surface 15'.

In assembling the parts of the filter unit together, the filter is initially positioned between the two housing parts with the periphery thereof aligned between the sealing portions of the two housing parts. In accordance with the teachings of the present invention, the unit is permanently sealed together in such a way as to isolate the central portion of the filter from its periphery to thus assure that all of the flow of fluid through the unit is through the filter. In addition, this sealing connection is made in such a way as to provide a visible indication that such sealing has been accomplished. In order to effect this result, the sealing portions of the two parts of the housing are pressed against the opposite sides of the filter and the sealing portion of at least one of the housing parts is melted and caused to flow through the aligned ports of the filter until it contacts and fuses to the sealing portion of the other part of the housing. As indicated above, this causes the filter in this area to appear transparent. The fusing of the sealing portions of the housing parts is effected by ultrasonic welding. In this welding, a high prequency piezo electric transducer is used. The transducer converts high frequency electrical energy at about 20,000 cycles per second to high frequency mechanical vibrations at about 20,000 cycles per second with a low amplitude of from 0.0001" to 0.005". This creates heat and directional energy causing the plastic material to melt and flow through the alignment pores of the filter and into fused engagement with the opposite part of the housing. In the embodiment of the invention shown in the drawings, the ultrasonic welding is applied to the flange portion 8 of the housing part 3 in the area of the sealing rib to cause the material thereof to melt and flow through the ports of the filter. Alternatively, the ultrasonic welding may be applied to the lower surface of the flange 15 of the housing part 4 in the area of the opposed rib.

In filtering intravenous solutions by attaching the filter unit of the present invention to the person's body at a point immediately adjacent to that at which the solution enters the person's vein, it is important to maintain a maximum head of pressure and prevent the creation of any air lock. Accordingly, it is important that the filter unit be maintained in proper orientation on the person's body and that provision be made for the connection of the tubings in such a manner that will not interfere with this orientation. For this purpose, the housing part 4 is provided with an outlet opening 17 which terminates in a coupling end 18 disposed above the lower extremity of the skirt portion 10 of the unit, that is, above the wing portions 11 of the skirt. As shown in FIG. 2, this outlet coupling end extends in a horizontal direction relative to the plane defined by the wing portions 11 of the skirt portion 10. Thus, attachment of the tubing 6' leading to the needle used in injecting the solution into the person's vein will extend along the contour of the person's wrist and thus, not interfere with the maintaining of the proper orientation of the unit thereon.

The above description of the present invention has been made with reference to the presently preferred embodiment; however, it is to be understood that various changes may be made thereto without departing from the scope of the invention as set out in the following claims.

We claim:
1. A filter unit comprising:
 (a) a normally appearing opaque porous filter constructed of sheet material appearing transparent to some degree when solid and which appears transparent to some degree as opposed to opaque when the pores thereof are filled with thermoplastic material having some degree of transparency;
 (b) a filter housing having first and second parts of thermoplastic material with at least one of the parts having some degree of transparency, said parts being disposed on opposite sides of said filter and having:
  (1) opposed central recessed portions at least partially spaced from the opposite sides of the central portion of said filter, and
  (2) opposed sealing portions surrounding said central recessed portions and aligned with a peripheral portion of said filter completely surrounding the central portion of the filter, the opposed sealing portion of at least one of the parts of said housing completely filling the aligned pores of the peripheral portion of said filter and sealed to the other opposed portion; and (c) inlet and outlet openings in the first and second parts of the filter housing, respectively, each of said openings being in communication with one side of the central portion of said filter.

2. A filter unit according to claim 1 wherein:
(a) the sealing portion of one of the parts of said housing comprises an integrally formed raised rib completely filling the aligned pores of the peripheral portion of said filter and fused to the sealing portion of the other part of said housing.

3. A filter unit according to claim 2 wherein:
(a) said filter comprises a plastic porous membrane, the pores of which are of equal size within the range from 0.4 to 5 microns and consist of between about 40% to 85% of the filter volume; and
(b) the part of said housing having said outlet opening further includes upstanding rib means extending from its central portion and defining a flat filter supporting surface disposed in the plane of the sealing portion thereof.

4. A filter unit according to claim 3 wherein:
(a) the pores of said filter are about 1.2 microns in size.

5. A filter unit according to claim 4 wherein:
(a) said filter housing is comprised of transparent impact resistant polystyrene.

6. A filter unit according to claim 5 for use in filtering intravenous solutions which are being fed into a person wherein:
(a) the part of said housing having said inlet opening includes a skirt portion extending downwardly beyond the other part of said housing having said outlet opening;
(b) said outlet opening in said other part includes a coupling end disposed above the lower extremity of said skirt portion; and
(c) the skirt portion includes means for receiving connecting means for attaching the filter unit to the person with the lower extremity of the skirt portion seated on the person's body.

7. The method of assembling a filter unit having a normally appearing opaque porous filter and a filter housing wherein said filter is constructed of sheet material appearing transparent to some degree when solid and which appears transparent to some degree as opposed to opaque when the pores thereof are filled with thermoplastic material having some degree of transparency and wherein said housing includes first and second parts of thermoplastic material at least one of which has some degree of transparency, each of said parts having a central recessed portion and an outer sealing portion surrounding said central portion, said method comprising the steps of:

(a) aligning the two parts of the housing on opposite sides of said filter with the sealing portions thereof opposing each other and aligned with a peripheral portion of said filter which completely surrounds the central portion of the filter;
(b) holding the sealing portions of the two parts of said housing against the aligned peripheral portions of the opposite sides of the filter;
(c) heating the aligned sealing portion of at least the transparent part of said housing to a temperature sufficient to melt the material of said sealing portion; and
(d) applying a force on said melted sealing portion in a direction toward the sealing portion of the other part of said housing to cause said melted material to flow through the pores of the aligned peripheral portion of said filter, completely fill said pores and fuse to the sealing surface of the other part of said housing.

8. The method of assembling a filter unit according to claim 7 wherein:
(a) the melting of and application of force to said sealing portion includes the steps of converting high frequency electrical energy to high frequency mechanical vibrations of low amplitude.

9. The method of assembling a filter unit according to claim 8 wherein:
(a) the melting of and application of force to said sealing portion includes the steps of converting electrical energy at about 20,000 cycles per second to mechanical vibrations at about 20,000 cycles per second with an amplitude of from about 0.0001" to about 0.005".

References Cited

UNITED STATES PATENTS

| | | | |
|---|---|---|---|
| 2,682,268 | 6/1954 | Ryan et al. | 210—445 X |
| 2,776,055 | 1/1957 | Adler | 210—94 |
| 2,901,112 | 8/1959 | Naftulin et al. | 210—94 |
| 3,031,082 | 4/1962 | Smith | 210—445 X |
| 3,295,297 | 1/1967 | Collins | 210—445 X |

SAMIH N. ZAHARNA, Primary Examiner

U.S. Cl. X.R.

210—232, 445